United States Patent [19]
Bender

[11] Patent Number: 5,906,048
[45] Date of Patent: May 25, 1999

[54] PROCESS AND PREFABRICATED PARTS FOR PRODUCING BRANCH PIECES FOR PIPES

[75] Inventor: Helmuth Bender, Wissenbach, Germany

[73] Assignee: Reich KG, Eschenburg-Wissenbach, Germany

[21] Appl. No.: 08/687,441

[22] PCT Filed: Dec. 15, 1995

[86] PCT No.: PCT/EP95/04973

§ 371 Date: Aug. 14, 1996

§ 102(e) Date: Aug. 14, 1996

[87] PCT Pub. No.: WO96/18843

PCT Pub. Date: Jun. 20, 1996

[30] Foreign Application Priority Data

Dec. 16, 1994 [DE] Germany ............................ 44 45 005

[51] Int. Cl.[6] .................. B23P 11/00; E03B 1/00
[52] U.S. Cl. ............ 29/890.14; 137/318; 137/5; 29/463; 29/890.124; 285/197
[58] Field of Search ........... 29/890.14, 890.124, 29/463; 137/318, 5; 285/197, 198, 199

[56] References Cited

U.S. PATENT DOCUMENTS

| 511,327 | 12/1893 | Eley | 137/318 |
|---|---|---|---|
| 660,525 | 10/1900 | Burritt | 137/318 |
| 2,790,652 | 4/1957 | Risley et al. | 137/318 |
| 2,983,477 | 5/1961 | Merrill | 137/318 |
| 3,252,475 | 5/1966 | Jones | 137/318 |
| 3,734,112 | 5/1973 | Finney et al. | 137/318 |
| 3,867,964 | 2/1975 | Gardner | 137/318 |
| 4,719,936 | 1/1988 | Tsubakimoto et al. | 137/318 |

FOREIGN PATENT DOCUMENTS

| 7410858 | 1/1976 | Germany . |
|---|---|---|
| 4239573 | 5/1994 | Germany . |

*Primary Examiner*—Paul T. Sewell
*Assistant Examiner*—J. Mohandesi
*Attorney, Agent, or Firm*—Dennison, Meserole, Scheiner & Schultz

[57] ABSTRACT

One or a plurality of valve-operated branch pieces can be attached to any point of any pipe. To this end, two opposite openings (16, 18) are made in the pipe (10), and a branch valve body is clamped about the pipe in bracket-like manner at the prepared site.

10 Claims, 3 Drawing Sheets

PROCESS AND PREFABRICATED PARTS FOR PRODUCING BRANCH PIECES FOR PIPES

BACKGROUND OF THE INVENTION

The present invention relates to a process for producing one or a plurality of valve-operated branch pieces for a pipe conducting a medium. The invention further proposes embodiments of the parts required for this purpose. In many technological fields one is confronted with the task of forming branch pieces for a main pipe conducting a medium, said branch pieces each diverting a certain amount of said medium from the main pipe, with a valve provided at the branching site controlling the amount to be diverted.

Examples of such may be the so-called heating circuit distributors in central heating systems, although the medium to be distributed thereby may also be oil or lubricant, one may consider pipe branches which become necessary in chemical process engineering. The range of applications is unlimited. The medium to be circulated may also be gaseous.

Just like the media to be diverted from a main pipe may be of very different nature, the present invention also comprises all kinds of materials from which the pipes and the branch pieces are made. These may be metallic pipes, iron pipes or pipes made of non-ferrous metals or they may also be reinforced or non-reinforced plastic pipes. Even the use of glass pipes may be considered.

Moreover, it is irrelevant for the purposes of the present invention whether the branch pieces are installed at a later stage in an already existing system, whether they are produced upon completion of a system in an assembling state or whether they are prefabricated branch pieces.

Various means are known for tap-boring pipes which will remain in operation during this process. German patent DE 42 39 573 A1 for example discloses a tap-boring device for pipes under pressure. This device will first serve as a hole gauge for a drilling tool which gauge may be clamped onto said pipe. This drilling tool is connected with a valve disk which will assume the function of the valve.

German utility model DE-GM 74 10 858 discloses a tap-boring pipe clip for pressurized air and water. Also in this case the drilling tool is provided with a sealing element. This prior art aims at providing a pipe in operation with a branch piece, with the drilling aid remaining on the pipe as a valve organ.

In contrast thereto, it is the object of the present invention to provide any number of valve-operated branch pieces at any point on a pipe which is not in operation.

SUMMARY OF THE INVENTION

According to the basic concept of the present invention, for each valve-operated branch piece two opposite openings are first made in the pipe transversely to the main pipe axis. To this end, a hole may be bored, by means of a drill, into the two opposite surface areas of the pipe transversely to the main axis of the metal pipe. According to the invention, a prepared two-part unit composed of a top part and a bottom part is placed on the branching site thus defined. The bottom part of said prepared unit has a through passage for the medium to be diverted which passage matches the bottom predrilled bottom opening. The top part of said unit on the other hand includes a valve core which fits into the opposite opening. Both parts are firmly and sealingly clamped onto the pipe from the exterior. Advantageously, the two halves of the prepared unit may be connected via a hinge for this purpose so that the prepared unit may be placed onto the two prepared openings like open tongs and is then clamped onto the pipe by screwing up or otherwise tightly connecting the free ends of said "tongs".

In accordance with the invention, said clamping onto the pipe may also be effected on either side by means of a screwed joint instead of the hinge.

Further details, features, advantages and applications of the present invention may be gathered from the following description of two embodiment of the invention.

BRIEF DESCRIPTION OF THE DRAWINGS

FIG. 1 shows how a medium-conducting pipe 10 is prepared according to the inventive process in a simple manner so that valve-operated branch pieces or valve-operated recirculation pieces for recirculating the medium into the pipe may be mounted thereon. The pipe may be made of any material such as iron, non-ferrous materials, metal, metallic alloys, plastics or glass. For use according to the present invention, the pipe may be in an assembly state, a state prior to assembly or in a temporarily halted operative state. The medium to be diverted or recirculated may be liquid or gaseous. It may be oil, coolant, separating agent, lubricant, non-aggressive chemicals, or hot or cold water. One field of application is a heating circuit distributor in a central heating system. Any other application in the construction of systems, in the construction of test systems or for subsequent installation in existing systems of this kind is conceivable.

Figure 1:
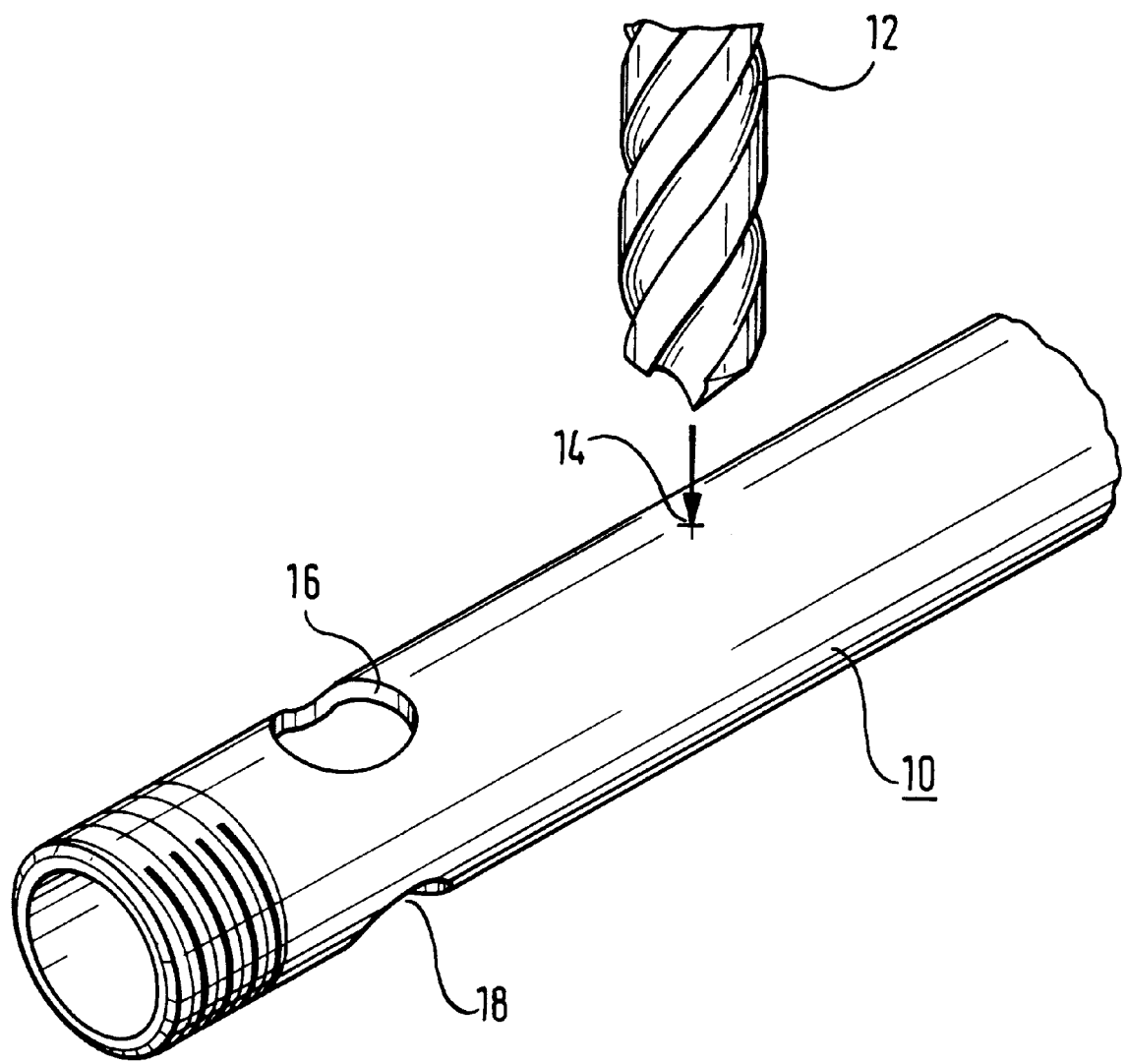
FIG. 1 is a schematic perspective view of the preparation of any random pipe for branching via a unit with a valve to be placed thereon, FIG. 2 a schematic lateral view of a pipe with two adjacent valve elements with branch pieces, FIG. 3 a cross-sectional view of a pipe branch piece of a first embodiment in a clamped state, FIG. 4 a sectional view of an open branch piece with a valve before such is clamped onto a pipe according to the embodiment shown in FIG. 3, FIG. 5 a sectional view similar to the one of FIG. 3 of a modified embodiment, and FIG. 6 a sectional view through a pipe branch piece according to a further embodiment example in a clamped state.

In contrast to the common prior art, the pipe 10 need not be interrupted or provided with a thread or flange or the like at the branching site. As is shown in FIG. 1 by way of example, a drill 12 is placed on the site 14 intended for the branch transversely to the axis of the pipe 10, and at right angles to the pipe axis two openings, a top opening 16 and a bottom opening 18, are drilled in a single step, thus preparing the pipe 10 for a valve-operated branch piece at the drilling site 14.

The valve with the branch connection piece is preferably a finished preassembled unit 20 which is ready for installation after the two openings have been provided, and may be placed across the openings 16 and 18 and around the pipe 10 in a simple, bracket-like manner and clamped tightly thereon.

Figure 3:
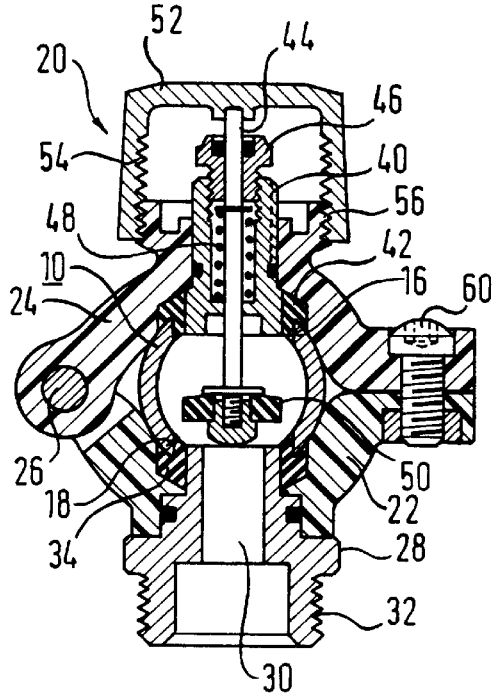
Figure 4:
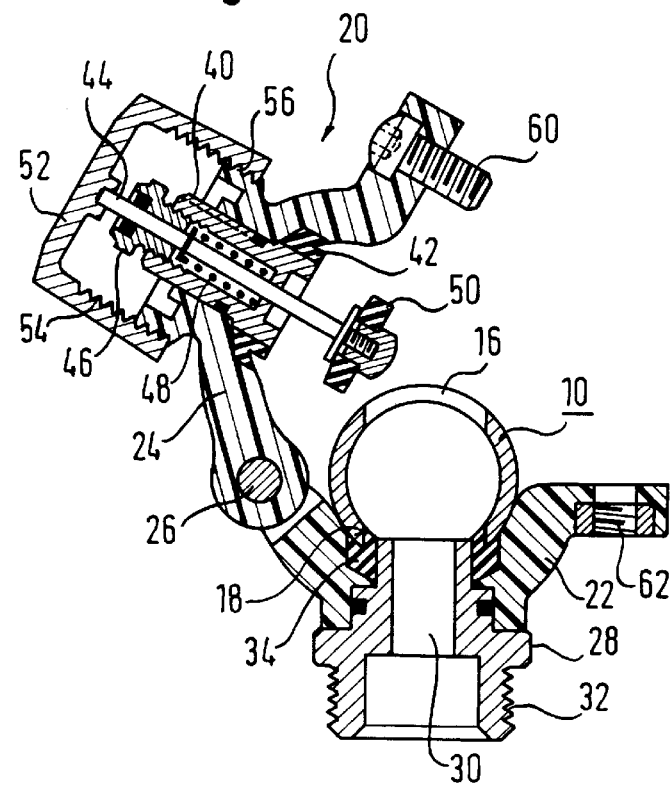

As shown in FIGS. 3 and 4, the unit 20 is essentially composed of a bottom part 22 and a top part 24. Both parts 22 and 24 are connected via a hinge 26 and may be made of plastics, metal or metal alloys.

The bottom part 22 comprises a firmly held pipe portion 28 with a through passage such as an inner duct 30 which represents the branch. The branching is effected via a pipe which is screwed onto a thread 32 by means of a union nut. The top opening edge of said duct 30 is surrounded by a sealing ring 34 which is stepped for optimum fit.

The top plastic part 24 holds the fully preassembled parts of the closing element for closing the top opening of the duct 30. This closing element includes a valve body 40 firmly connected with the plastic top part 24. The bottom part of the valve body 40 and the adjoining section of the plastic top part 24 are surrounded by a sealing ring 42 which is stepped for optimum fit. The valve body 40 guidingly surrounds a valve stem 44 which is sealed from the top by means of a bush 46. Furthermore, a spring 48 is provided in the valve body 40 which spring cushions the stem 44. At the bottom of the stem 44 a valve disk 50 is provided. At the top of the stem 44, the stem is connected with a rotary handle 52 the internal thread 54 of which engages an external thread 56 provided on the top collar of the plastic top part 24. By turning the rotary handle 52, the valve disk 50 is raised or lowered.

Of course, this common valve structure may be modified as desired according to the purpose of the individual application. What is essential to the present invention is merely that the structure composed of a bottom part 22 and a top part 24 connected via a hinge or in a tong-like manner is used such that the bottom part with the sealing ring 34 may first be inserted in the opening 18. Then the top part 24 is swung aroung the hinge 26, with the bottom valve stem 44 and the valve disk 50 being inserted in the pipe 10 via the opening 16. Finally, on the side opposite the hinge 26, the top and bottom parts 24 and 22 are firmly closed as a unit 20 and firmly clamped onto the pipe 10 by tightening a screw 60 which has been inserted in a thread 62. In this final state, the valve stem 44 and the valve disk 50 are axially flush with the through duct 30, and a valve-operated branch from the pipe 10 into the duct 30 has been created in a simple manner. By turning the handle 52 the branching valve may be opened more or less, or closed completely.

The important advantage here is that a valve-operated branch piece may be produced at any site on a pipe by using one single pre-assembled part.

Figure 5:
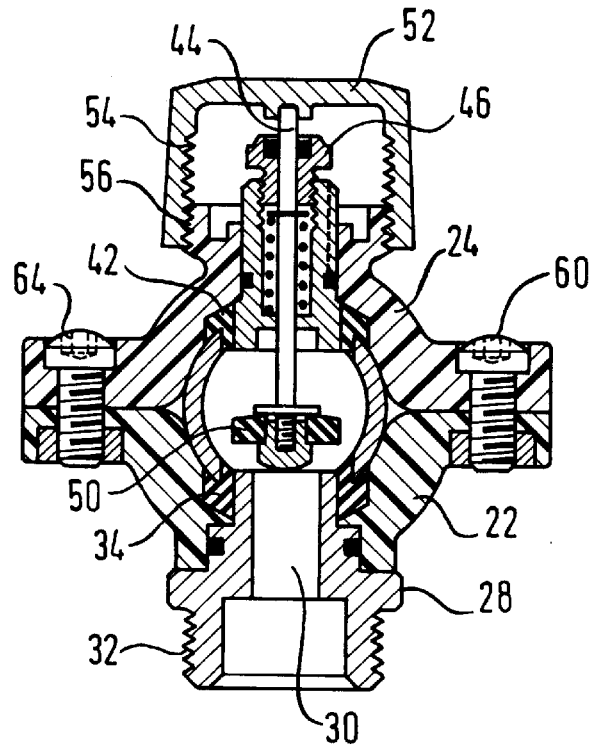

However, also a two-part unit as shown in FIG. 5 may be used. In this Figure, like reference numerals indicate like parts. The difference with regard to FIGS. 3 and 4 is that the bottom part 22 and the top part 24 are connected by means of a second screw 64 instead of the hinge 26.

Figure 2:
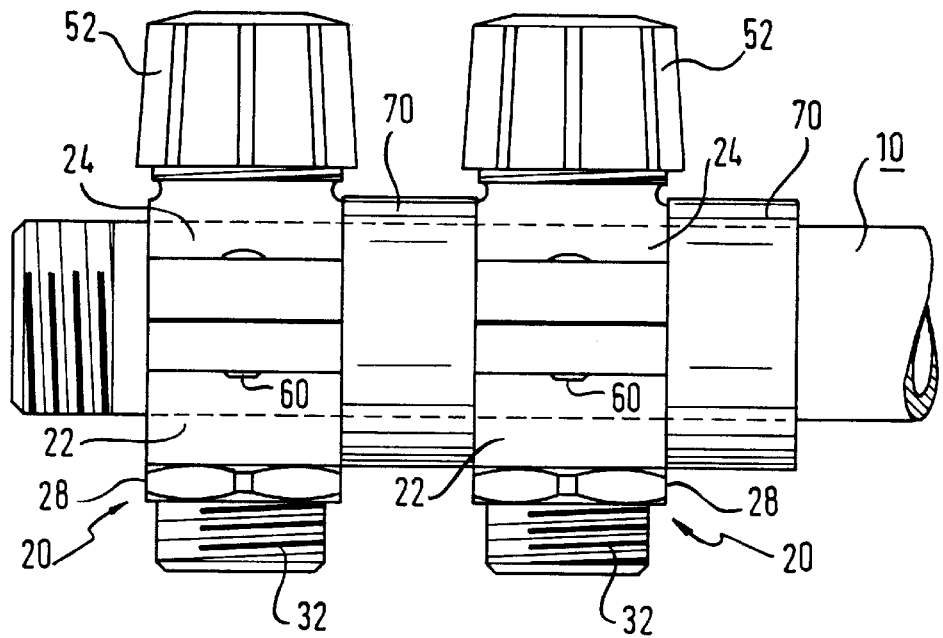

A further advantage is obtained in that the bracket formed by the parts 22 and 24 insulatingly surrounds the pipe 10 at the branching site. If insulation 70 (FIG. 2) is also required for adjacent parts of the pipe 10, then the adjacent insulations may also be firmly tightened on the pipe 10 by clamping the parts 22 and 24.

Figure 6:
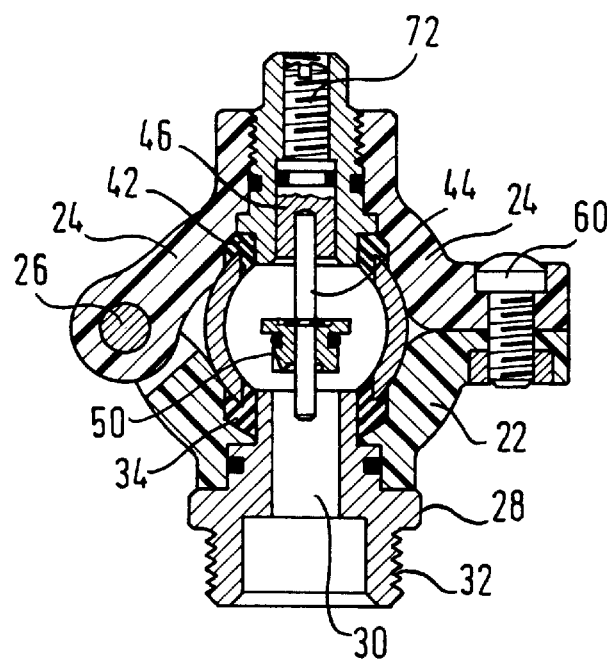

FIG. 6 shows an embodiment which is particularly advantageous for branches on forward runs. In this Figure, like reference numerals indicate like parts. The difference with regard to FIGS. 3 and 4 is that the stem 44 on which the valve disk 50 is mounted is firmly fitted into the bush 46, with the combination of bush 46, stem 44 and valve disk 50 being movable along the axis of said passage or the duct 30 by means of a screw 72. Advantageously, the screw 72 may be connected with an external handle (not shown). Also in this embodiment, the bottom part 22 and the top part 24 may be connected by means of a second screw instead of the hinge 26. The advantage of the embodiment example shown in FIG. 6 is amongst others that when pressure acts on the side of the pipe facing away from the duct 30, e.g. due to the fact that the pressure prevailing in the pipe 10 containing the medium is higher than the pressure in the pipeline screwed onto the thread 32, no undesired closing of the valve may occur.

I claim:

1. A process for assembling at least one valve operable branch on a pipe containing a medium comprising the following steps:

generating a first and a second opening at opposing sides of the pipe;

providing a two part unit composed of a top part and a bottom part, the top part including a valve; body having an internal thread, a valve stem having an external thread and a valve disc, the bottom part including a pipe portion which can be firmly held against the pipe, a duct portion having a top opening edge and a threaded bottom end;

aligning the two part unit so as to fit the top part over the first opening and the bottom part over the second opening;

clamping the two part unit together until the openings are firmly sealed; and turning the valve stem until the valve disc rests firmly against the top opening edge of the duct portion.

2. The process according to claim 1, wherein the pipe is covered by an insulating material which becomes clamped by the two-part unit.

3. The process according to claim 1, wherein the step of clamping is accomplished by pivoting a hinge connecting the top and bottom part and tightening a fastener.

4. The process according to claim 1, wherein the step of clamping is accomplished by connecting the top and bottom part with two fasteners.

5. A device for producing a valve operable branch on a pipe wherein a first and a second opening at opposite locations and transversely to the pipe axis are provided, said device comprising:

a first part including a pipe portion with an inner duct having a top edge, a stepped sealing ring for alignment against the first opening;

said inner duct having a threaded bottom end for connecting a branching pipe;

a second part including a valve body having an internal thread, a valve stem having an external thread and a valve disc, the valve body having a stepped sealing ring inserted in a bottom portion for alignment against the second opening; and fastening means for clamping the first and second part together so that the first and second openings are firmly sealed.

6. The device according to claim 5, wherein the first and the second part are connected by a hinge and the fastening means is a bolt.

7. The device according to claim 5, wherein the first and the second part are connectable by providing threaded openings and the fastening means are bolts.

8. The device according to claim 5, wherein the first and the second part are made of plastic material.

9. The device according to claim 5, wherein the first and the second part are made of a metal.

10. The device according to claim 5, wherein the first and the second part are made of a metal alloy.

* * * * *